(12) United States Patent
Jiang

(10) Patent No.: US 11,871,455 B2
(45) Date of Patent: Jan. 9, 2024

(54) RANDOM ACCESS CONTROL METHOD AND RANDOM ACCESS CONTROL APPARATUS

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 325 days.

(21) Appl. No.: 17/258,319

(22) PCT Filed: Jul. 16, 2018

(86) PCT No.: PCT/CN2018/095803
§ 371 (c)(1),
(2) Date: Jan. 6, 2021

(87) PCT Pub. No.: WO2020/014824
PCT Pub. Date: Jan. 23, 2020

(65) Prior Publication Data
US 2021/0274560 A1  Sep. 2, 2021

(51) Int. Cl.
*H04W 74/08* (2009.01)
*H04B 7/06* (2006.01)
*H04W 80/02* (2009.01)

(52) U.S. Cl.
CPC ...... *H04W 74/0833* (2013.01); *H04B 7/0695* (2013.01); *H04W 80/02* (2013.01)

(58) Field of Classification Search
CPC .......... H04B 7/0695; H04W 74/0833
See application file for complete search history.

(56) References Cited

U.S. PATENT DOCUMENTS

| | | | |
|---|---|---|---|
| 2019/0274169 A1* | 9/2019 | Tsai | H04W 56/0045 |
| 2019/0281480 A1* | 9/2019 | Wei | H04W 24/08 |
| 2021/0006457 A1* | 1/2021 | You | H04L 41/0672 |
| 2021/0058797 A1* | 2/2021 | Yoshioka | H04W 24/04 |

(Continued)

FOREIGN PATENT DOCUMENTS

WO    WO-2019192476 A1 * 10/2019 ........... H04B 7/0695

OTHER PUBLICATIONS

Ericsson "Possible ambiguity for BFD timer expiry and BFI counter" Agenda Item: 10.3.1.4.2 3GPP TSG-RAN WG2 AH 1807 Montreal, Canada, Jul. 2-6, 2018 Tdoc R2-1810077 (Year: 2018).*

*Primary Examiner* — Gary Mui
(74) *Attorney, Agent, or Firm* — Finnegan, Henderson, Farabow, Garrett & Dunner, L.L.P.

(57) ABSTRACT

A method for controlling random access is provided according to the embodiments of the present disclosure, which is applied to an electronic device. The method includes determining whether a count value of a beam failure indication counter is greater than or equal to a preset value in response to receiving a beam failure instance indication by a medium access control layer from a physical layer; and initiating random access in response to the count value of the beam failure indication counter being greater than or equal to the preset value, and performing a preset operation to avoid triggering further random access during the random access. The embodiments of the present disclosure may prevent the user device from occupying resources for contention-free random access for a long time.

14 Claims, 4 Drawing Sheets

(56) References Cited

U.S. PATENT DOCUMENTS

| | | | |
|---|---|---|---|
| 2021/0091845 A1* | 3/2021 | Wu | H04W 24/04 |
| 2021/0105172 A1* | 4/2021 | Luo | H04W 74/0833 |
| 2021/0274569 A1* | 9/2021 | Jiang | H04W 74/008 |
| 2021/0306056 A1* | 9/2021 | Jiang | H04W 74/008 |

* cited by examiner

RANDOM ACCESS CONTROL METHOD AND RANDOM ACCESS CONTROL APPARATUS

CROSS REFERENCE TO RELATED APPLICATIONS

This application is a national phase application based on International Application No. PCT/CN2018/095803, filed Jul. 16, 2018, the content of which is incorporated herein by reference.

TECHNICAL FIELD

The present application relates to the field of communication technology, and particularly to a method and an apparatus for controlling random access, an electronic device and a computer readable storage medium.

BACKGROUND

A user device may monitor beam signals in NR (New Radio). In response to the monitored beam signals which do not meet the requirements, a physical layer may send a beam failure instance indication to a medium access control layer, which is recorded as one beam failure. When the beam failure instance indication sent from the physical layer has been received by the medium access control layer, and in a case where the count value of the beam failure indication counter is greater than or equal to the preset value, the user device may initiate random access. The initiated random access may be a contention free random access (contention free random access) or a CBRA (contention based random access).

A beam failure recovery timer is disposed in the related art. When the user device triggers the random access, the timer resets and starts timing. In case that the timer does not expire, the user device preferentially selects resources for contention free random access to initiate the contention free random access when initiating the random access. In case that the timer expires, the user device selects resources for contention free random access to initiate the CBRA when initiating the random access. In this way, it ensures that the user device will not occupy the same resources for a long time to initiate the same type of random access.

However, since the physical layer does not know whether the count value of beam failures is greater than or equal to the preset value, a beam failure instance indication is sent to the medium access control layer once it is detected that the beam signals do not meet the requirements. As a result, after the count value of beam failures is greater than or equal to the preset value, the user device initiates the random access when receiving a beam failure instance indication sent from the physical layer for a first time; and the user device continues to initiate the random access when receiving a beam failure instance indication sent from the physical layer for a second time.

In this situation, it causes the timer (which has already started timing in response to the first random access initiated by the user device) to reset and re-time when the user device initiates the random access again, so that the timer may not expire for a long time and the user device then selects resources for contention free random access for a long time to initiate the contention free random access, which leads to excessive occupation on the resources for contention free random access.

SUMMARY

In view of the above, a method and an apparatus for controlling random access, an electronic device and a computer readable storage medium are provided according to embodiments of the invention.

According to a first aspect of an embodiment of the invention, a method for controlling random access is provided. The method may be applied to an electronic device and include:

determining whether a count value of a beam failure indication counter is greater than or equal to a preset value in response to receiving a beam failure instance indication by a medium access control layer from a physical layer; and initiating random access in response to the count value of the beam failure indication counter being greater than or equal to the preset value, and performing a preset operation to avoid triggering further random access during the random access.

Optionally, the preset operation includes:
controlling the medium access control layer to ignore a further beam failure instance indication sent from the physical layer.

Optionally, the method further includes:
controlling the medium access control layer not to ignore the further beam failure instance indication sent from the physical layer after the random access is successful.

Optionally, the preset operation includes:
controlling the physical layer to stop sending the beam failure instance indication to the medium access control layer.

Optionally, the method further includes: controlling the physical layer to continue to send the beam failure instance indication to the medium access control layer after the random access is successful.

Optionally, the method further includes:
sending indication information to the physical layer via the medium access control layer before controlling the physical layer to stop sending the beam failure instance indication to the medium access control layer, wherein the indication information indicates to the physical layer that the electronic device is performing the random access, or indicates the physical layer to stop sending the beam failure instance indication to the medium access control layer.

Optionally, the preset operation includes:
setting the count value of the beam failure indication counter to zero.

Optionally, the method further includes:
resetting the count value of the beam failure indication counter to zero after the random access is successful.

Optionally, the performing the preset operation to avoid triggering further random access during the random access includes:

determining a serving cell corresponding to the beam failure indication counter, and performing the preset operation for the serving cell.

Optionally, the serving cell includes at least one of:

a primary cell, a primary-secondary cell, and a serving cell other than the primary cell and the primary-secondary cell.

According to a second aspect of an embodiment of the invention, an apparatus for controlling random access is provided. The apparatus may be applied to an electronic device and include:

a count value determining module, configured to determine whether a count value of a beam failure indication counter is greater than or equal to a preset value in response to receiving a beam failure instance indication by a medium access control layer from a physical layer, and a random access control module, configured to initiate random access in response to the count value of the beam failure indication counter being greater than or equal to the preset value, and to perform a preset operation to avoid triggering further random access during the random access.

Optionally, the preset operation includes:

controlling the medium access control layer to ignore a further beam failure instance indication sent from the physical layer.

Optionally, the random access control module is further configured to control the medium access control layer not to ignore the further beam failure instance indication sent from the physical layer after the random access is successful.

Optionally, the preset operation includes:

controlling the physical layer to stop sending the beam failure instance indication to the medium access control layer.

Optionally, the random access control module is further configured to control the physical layer to continue to send the beam failure instance indication to the medium access control layer after the random access is successful.

Optionally, the apparatus further includes:

a physical layer indication module, configured to send indication information to the physical layer via the medium access control layer before controlling the physical layer to stop sending the beam failure instance indication to the medium access control layer, wherein the indication information may indicate to the physical layer that the electronic device is performing the random access, or indicate the physical layer to stop sending the beam failure instance indication to the medium access control layer.

Optionally, the preset operation includes:

setting the count value of the beam failure indication counter to zero.

Optionally, the random access control module is further configured to reset the count value of the beam failure indication counter to zero after the random access is successful.

Optionally, the random access control module includes:

a cell determining submodule, configured to determine a serving cell corresponding to the beam failure indication counter, and an operation performing submodule, configured to perform the preset operation for the serving cell.

Optionally, the serving cell includes at least one of:

a primary cell, a primary-secondary cell, and a serving cell other than the primary cell and the primary-secondary cell.

According to a third aspect of an embodiment of the invention, an electronic device is provided, which may include:

a processor, and a memory configured to store instructions executable by the processor, wherein the processor may be configured to perform the method as described in any one of the above embodiments.

According to a fourth aspect of an embodiment of the invention, a computer-readable storage medium having a computer program stored thereon is provided. The program is executed by a processor to implement the steps in the method as described in any one of the above embodiments.

According to the embodiments of the present disclosure, when the beam failure instance indication sent from the physical layer has been received by the medium access control layer, and in a case where the count value of the beam failure indication counter is greater than or equal to the preset value, the user device may initiate the random access, and perform a preset operation to avoid triggering further random access during the random access.

By avoiding triggering further random access during the random access, a beam failure recovery timer, which was started by the initiated random access, would not be caused to reset or retiming until it expires. In this way, the beam failure recovery timer may expire in a relatively short time period, to allow the user device to select resources for contention free random access to initiate contention based random access after a time period from the selection of the resources for contention free random access to initiate contention free random access, thereby avoiding occupying the resources for contention free random access for a long time.

BRIEF DESCRIPTION OF THE DRAWINGS

In order to explain the technical solutions in the embodiments of the present application more clearly, the drawings used in the description of the embodiments will be briefly introduced below. Obviously, the drawings in the following description are only for some embodiments of the present application. Those skilled in the art may also obtain other drawings based on these drawings without creative work.

DETAILED DESCRIPTION

The technical solutions in the embodiments of the present application will be described clearly and completely in conjunction with the accompanying drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

Figure 1:
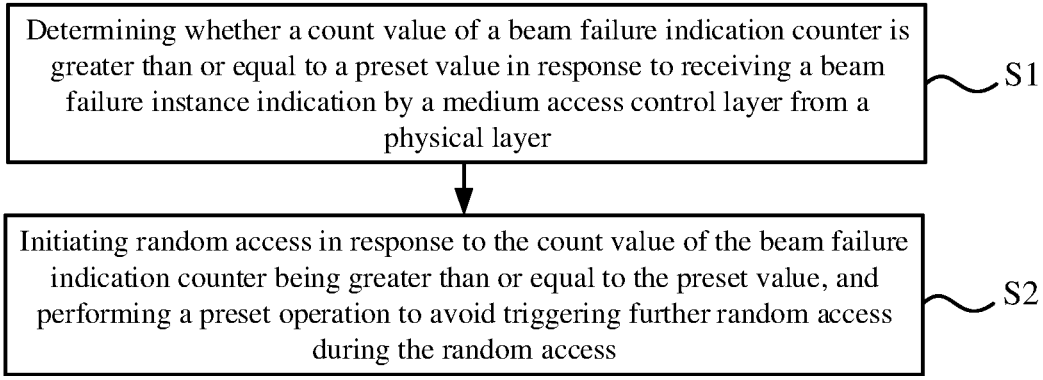
FIG. 1 is a schematic flowchart illustrating a method for controlling random access according to an embodiment of the present disclosure.

FIG. 1 is a schematic flowchart illustrating a method for controlling random access according to an embodiment of the present disclosure. The method for controlling random access illustrated in this embodiment may be applied to an electronic device which may be a user device for communication, such as a mobile phone, a tablet computer, a smart wearable device, etc. The user device may implement the communication based on NR (New Radio).

As shown in FIG. 1, the method for controlling random access may include the following steps.

At step S1, it is determined whether a count value of a beam failure indication counter (BFI_COUNTER) is greater than or equal to a preset value in response to receiving a beam failure instance indication by a medium access control layer from a physical layer. The preset value may be set as necessary.

At step S2, random access is initiated in response to the count value of the beam failure indication counter being greater than or equal to the preset value, and a preset operation is performed to avoid triggering further random access during the random access.

In an embodiment, when the beam failure instance indication sent from the physical layer has been received by the medium access control layer, and in a case where the count value of the beam failure indication counter is greater than or equal to the preset value, the user device may initiate the random access, and perform the preset operation to avoid triggering further random access during the random access.

By avoiding triggering further random access during the random access, a beam failure recovery timer, which was started by the initiated random access, would not be caused to reset or retiming until it expires. In this way, the beam failure recovery timer may expire in a relatively short time period, to allow the user device to select resources for contention free random access to initiate contention based random access after a time period from the selection of the resources for contention free random access to initiate contention free random access, thereby avoiding occupying the resources for contention free random access for a long time.

It is to be noted that the preset operation may be set as necessary. The function of the preset operation is to avoid triggering further random access during the random access. The preset operation will be illustrated below according to some embodiments.

Optionally, the preset operation may include:
 controlling the medium access control layer to ignore a further beam failure instance indication sent from the physical layer.

In an embodiment, after the user device initiates the random access, it may control the medium access control layer to ignore the further beam failure instance indication sent from the physical layer. That is, the physical layer may still send the further beam failure instance indication to the medium access control layer, but the medium access control layer will not determine whether the count value of the beam failure indication counter is greater than or equal to the preset value. Accordingly, even if the count value of the beam failure indication counter is greater than or equal to the preset value, the random access will not be triggered, thereby avoiding triggering the further random access during the random access.

Figure 2:
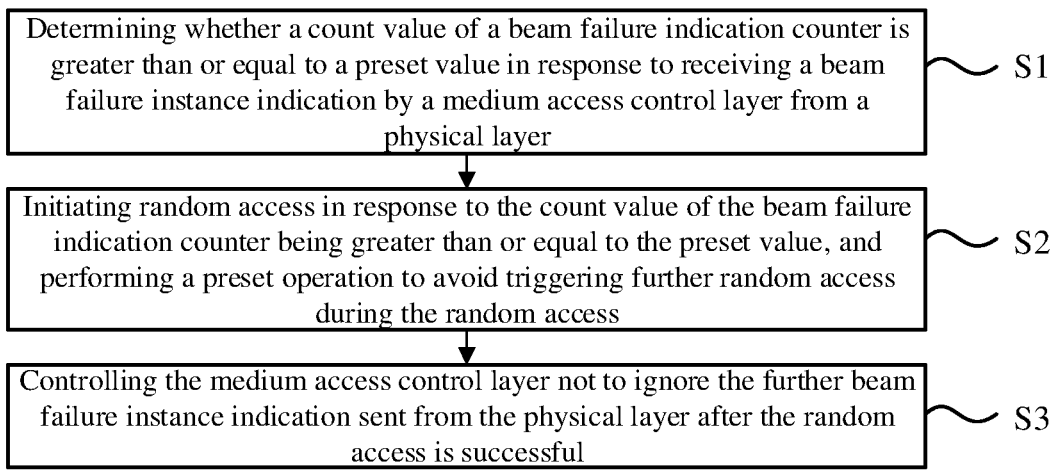
FIG. 2 is a schematic flowchart illustrating another method for controlling random access according to an embodiment of the present disclosure.

FIG. 2 is a schematic flowchart illustrating another method for controlling random access according to an embodiment of the present disclosure. As shown in FIG. 2, on a basis of the embodiment shown in FIG. 1, the method further includes the following steps.

At step S3, the medium access control layer is controlled not to ignore the further beam failure instance indication sent from the physical layer after the random access is successful.

In an embodiment, if the initiated random access is successful, it means that the user device has completed the beam failure recovery. Accordingly, it may continue to monitor the beam and restart the counting of the number of beam failures, so that the medium access control layer may be controlled not to ignore the further beam failure instance indication sent from the physical layer. That is, the beam failure instance indication received may be counted by the beam failure indication counter when the medium access control layer receives the further beam failure instance indication sent from the physical layer.

It is to be noted that the successful random access mentioned in this embodiment and subsequent embodiments may refer to random access that is determined by the user device as being successful by receiving information from a physical control downlink channel.

Optionally, the preset operation may include:
 controlling the physical layer to stop sending the beam failure instance indication to the medium access control layer.

In an embodiment, after the user device initiates random access, it may control the physical layer to stop sending the beam failure instance indication to the medium access control layer. Since the medium access control layer would not receive the beam failure instance indication sent from the physical layer, the random access may not be triggered even if the count value of the beam failure indication counter is greater than or equal to the preset value, thereby avoiding triggering the further random access during the random access.

Figure 3:
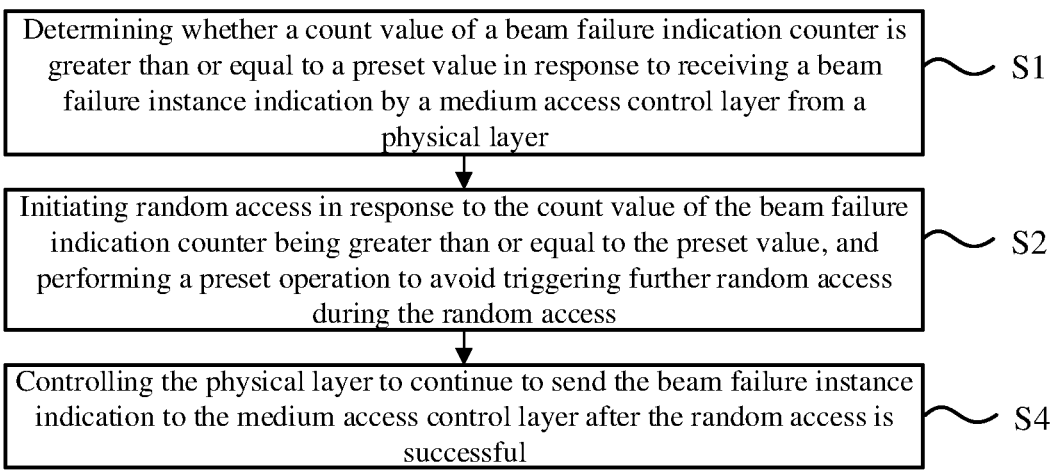
FIG. 3 is a schematic flowchart illustrating yet another method for controlling random access according to an embodiment of the present disclosure.

FIG. 3 is a schematic flowchart illustrating yet another method for controlling random access according to an embodiment of the present disclosure. As shown in FIG. 3, on a basis of the embodiment shown in FIG. 1, the method may further include the following step.

At step S4, the physical layer is controlled to continue to send the beam failure instance indication to the medium access control layer after the random access is successful.

Figure 4:
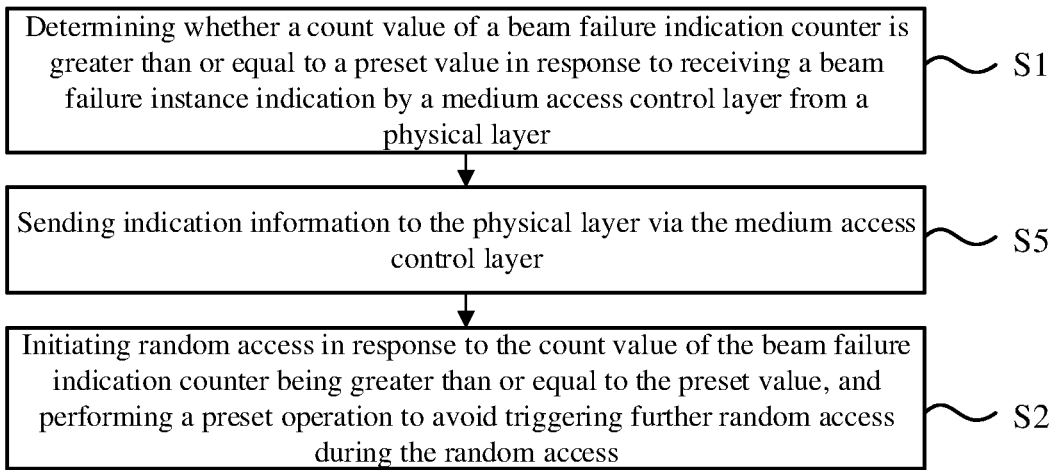
FIG. 4 is a schematic flowchart illustrating yet another method for controlling random access according to an embodiment of the present disclosure.

In an embodiment, if the initiated random access is successful, it means that the user device has completed the beam failure recovery. Accordingly, it may continue to monitor the beam and restart the counting of the number of beam failures, so that the physical layer may be controlled to continue to send the beam failure instance indication to the medium access control layer. In this way, when the medium access control layer receives the further beam failure instance indication sent from the physical layer, the beam failure instance indication received may be counted by the beam failure indication counter FIG. 4 is a schematic flowchart illustrating yet another method for controlling random access according to an embodiment of the present disclosure. As shown in FIG. 4, on a basis of the embodiment shown in FIG. 3, the method may further include the following steps.

At step S5, indication information is sent to the physical layer via the medium access control layer before controlling the physical layer to stop sending the beam failure instance indication to the medium access control layer, wherein the indication information may indicate to the physical layer that the electronic device is performing the random access, or indicate the physical layer to stop sending the beam failure instance indication to the medium access control layer.

In an embodiment, the indication information may be sent to the physical layer via the medium access control layer, to indicate to the physical layer that the electronic device is performing the random access through the indication information, so as to stop the physical layer to send the beam failure instance indication to the medium access control layer, or to indicate directly the physical layer to stop sending the beam failure instance indication to the medium access control layer.

Optionally, the preset operation may include:
setting the count value of the beam failure indication counter to zero.

In an embodiment, after the user device initiates the random access, the count value of the beam failure indication counter may be set to zero. That is, since the count value of the beam failure indication counter is set to zero, which is less than the preset value and does not meet the condition for triggering random access, the random access would not be triggered although the physical layer may send the beam failure instance indication to the medium access control layer, thereby avoiding triggering the further random access during the random access.

Figure 5:
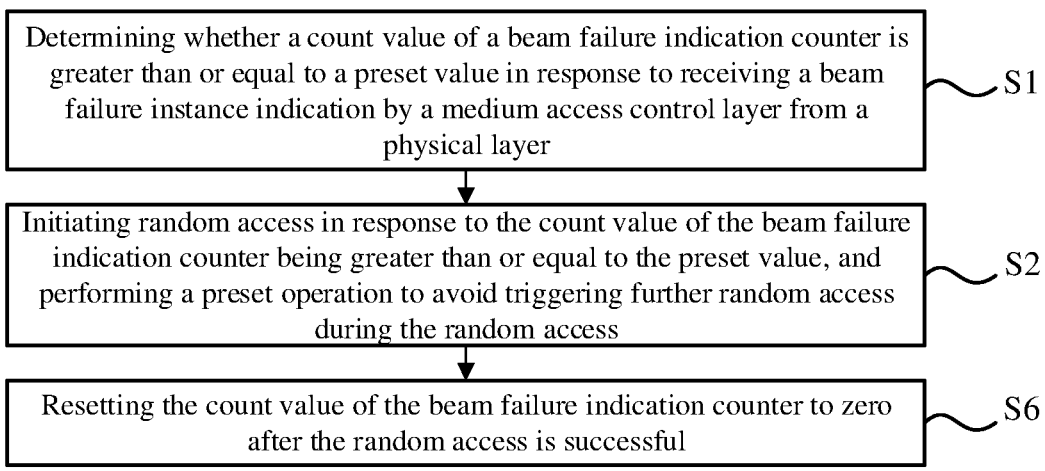
FIG. 5 is a schematic flowchart illustrating yet another method for controlling random access according to an embodiment of the present disclosure.

FIG. 5 is a schematic flowchart illustrating yet another method for controlling random access according to an embodiment of the present disclosure. As shown in FIG. 5, on a basis of the embodiment shown in FIG. 1, the method may further include the following step. At step S6, the count value of the beam failure indication counter is reset to zero after the random access is successful.

In an embodiment, if the initiated random access is successful, it means that the user device has completed the beam failure recovery. Accordingly, it may continue to monitor the beam and restart the counting of the number of beam failures, so as to reset the count value of the beam failure indication counter to zero. In this way, when the medium access control layer receives the further beam failure instance indication sent from the physical layer, the newly received beam failure instance indication may be counted by the beam failure indication counter.

Figure 6:
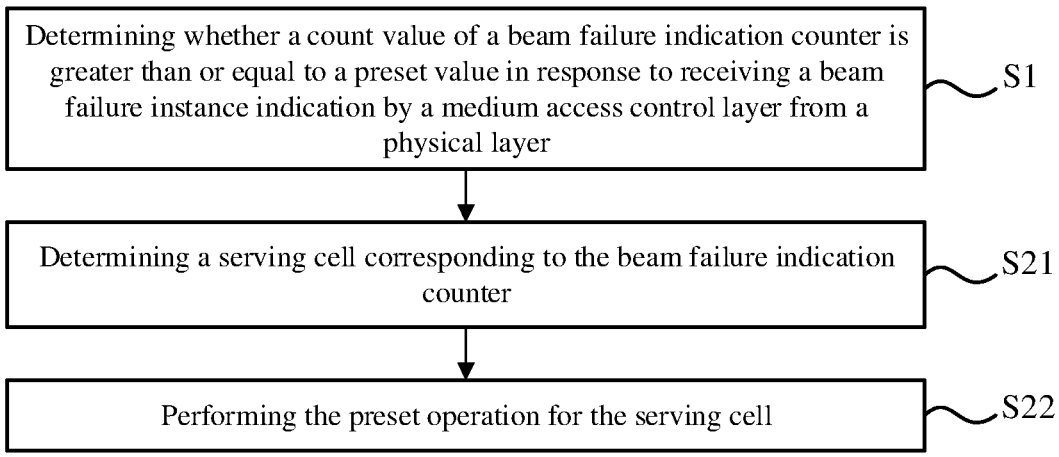
FIG. 6 is a schematic flowchart for performing a preset operation according to an embodiment of the present disclosure.

FIG. 6 illustrates a schematic flowchart for performing a preset operation according to an embodiment of the present disclosure. As shown in FIG. 6, on a basis of the embodiment shown in FIG. 1, the step of performing the preset operation to avoid triggering further random access during the random access may include the following steps.

At step S21, a serving cell corresponding to the beam failure indication counter is determined;

At step S22, the preset operation is performed for the serving cell.

In an embodiment, the beam failure indication counter may be configured for the serving cell. Here, the serving cell includes at least one of a primary cell, a primary-secondary cell, and a serving cell other than the primary cell and the primary-secondary cell. Accordingly, for the beam failure indication counter with the count value greater than or equal to the preset value, the serving cell corresponding to the beam failure indication counter may be determined. Then, the preset operation may be performed for the serving cell, to avoid performing the preset operation mistakenly for a cell corresponding to the beam failure indication counter with the count value less than the preset value.

Corresponding to the foregoing embodiments of the method for controlling random access, embodiments of an apparatus for controlling random access are also according to the present disclosure.

Figure 7:
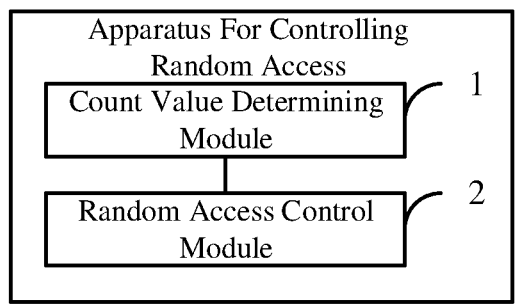
FIG. 7 is a schematic block diagram illustrating an apparatus for controlling random access according to an embodiment of the present disclosure.

FIG. 7 is a schematic block diagram illustrating an apparatus for controlling random access according to an embodiment of the present disclosure. The apparatus for controlling random access illustrated in this embodiment may be applied to an electronic device which may be a user device for communication, such as a mobile phone, a tablet computer, a smart wearable device, etc. The user device may implement the communication based on NR.

As shown in FIG. 7, the apparatus for controlling random access may include a count value determining module 1 and a random access control module 2.

The count value determining module 1 may be configured to determine whether a count value of a beam failure indication counter is greater than or equal to a preset value in response to receiving a beam failure instance indication by a medium access control layer from a physical layer.

The random access control module 2 may be configured to initiate random access in response to the count value of the beam failure indication counter being greater than or equal to the preset value, and to perform a preset operation to avoid triggering further random access during the random access.

Optionally, the preset operation may include:
controlling the medium access control layer to ignore a further beam failure instance indication sent from the physical layer.

Optionally, the random access control module may be further configured to control the medium access control layer not to ignore the further beam failure instance indication sent from the physical layer after the random access is successful.

Optionally, the preset operation may include:
controlling the physical layer to stop sending the beam failure instance indication to the medium access control layer.

Optionally, the random access control module may be further configured to control the physical layer to continue to send the beam failure instance indication to the medium access control layer after the random access is successful.

Figure 8:
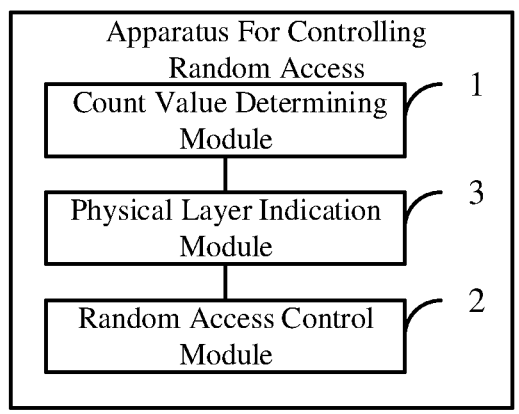
FIG. 8 is a schematic block diagram illustrating another apparatus for controlling random access according to an embodiment of the present disclosure.

FIG. 8 is a schematic block diagram illustrating another apparatus for controlling random access according to an embodiment of the present disclosure. As shown in FIG. 8, on a basis of the embodiment shown in FIG. 7, the apparatus further includes a physical layer indication module 3.

The physical layer indication module 3 may be configured to send indication information to the physical layer via the medium access control layer before controlling the physical layer to stop sending the beam failure instance indication to the medium access control layer, wherein the indication information may indicate to the physical layer that the electronic device is performing the random access, or indicate the physical layer to stop sending the beam failure instance indication to the medium access control layer.

Optionally, the preset operation may include:
setting the count value of the beam failure indication counter to zero.

Optionally, the random access control module may be further configured to reset the count value of the beam failure indication counter to zero after the random access is successful.

Figure 9:
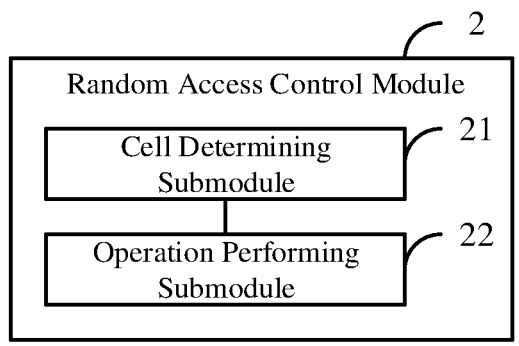
FIG. 9 is a schematic block diagram illustrating the random access control module according to an embodiment of the present disclosure.

FIG. 9 is a schematic block diagram illustrating the random access control module 2 according to an embodiment of the present disclosure. As shown in FIG. 9, on a basis of the embodiment shown in FIG. 7, the random access control module 2 includes:

a cell determining submodule 21 configured to determine a serving cell corresponding to the beam failure indication counter, and an operation performing submodule 22 configured to perform the preset operation for the serving cell.

Optionally, the serving cell includes at least one of:

a primary cell, a primary-secondary cell, and a serving cell other than the primary cell and the primary-secondary cell.

Regarding the apparatus in the foregoing embodiment, the specific manner in which each module performs operations has been described in detail in the embodiment of the related method and the detailed descriptions will not be stated here.

The apparatus embodiments basically correspond to the method embodiments, and their relevant part may refer to the part of the descriptions of the method embodiment. The apparatus embodiments described above are merely illustrative. The units described as separate components may or may not be physically separated, and the components displayed as units may or may not be physical units, which may be located in one place or may be distributed to multiple network units. Some or all of the modules may be selected as necessary to achieve the objectives of the solutions of the embodiments. Those skilled in the art may understand and implement them without creative work.

An electronic device is also according to the embodiments of the present disclosure, including:

a processor, and a memory configured to store instructions executable by the processor, wherein the processor may be configured to perform the method described in any of the above embodiments.

A computer-readable storage medium having a computer program stored thereon is also according to the embodiments of the present disclosure. When the program is executed by a processor, the steps in the method described in any of the above embodiments are implemented.

Figure 10:
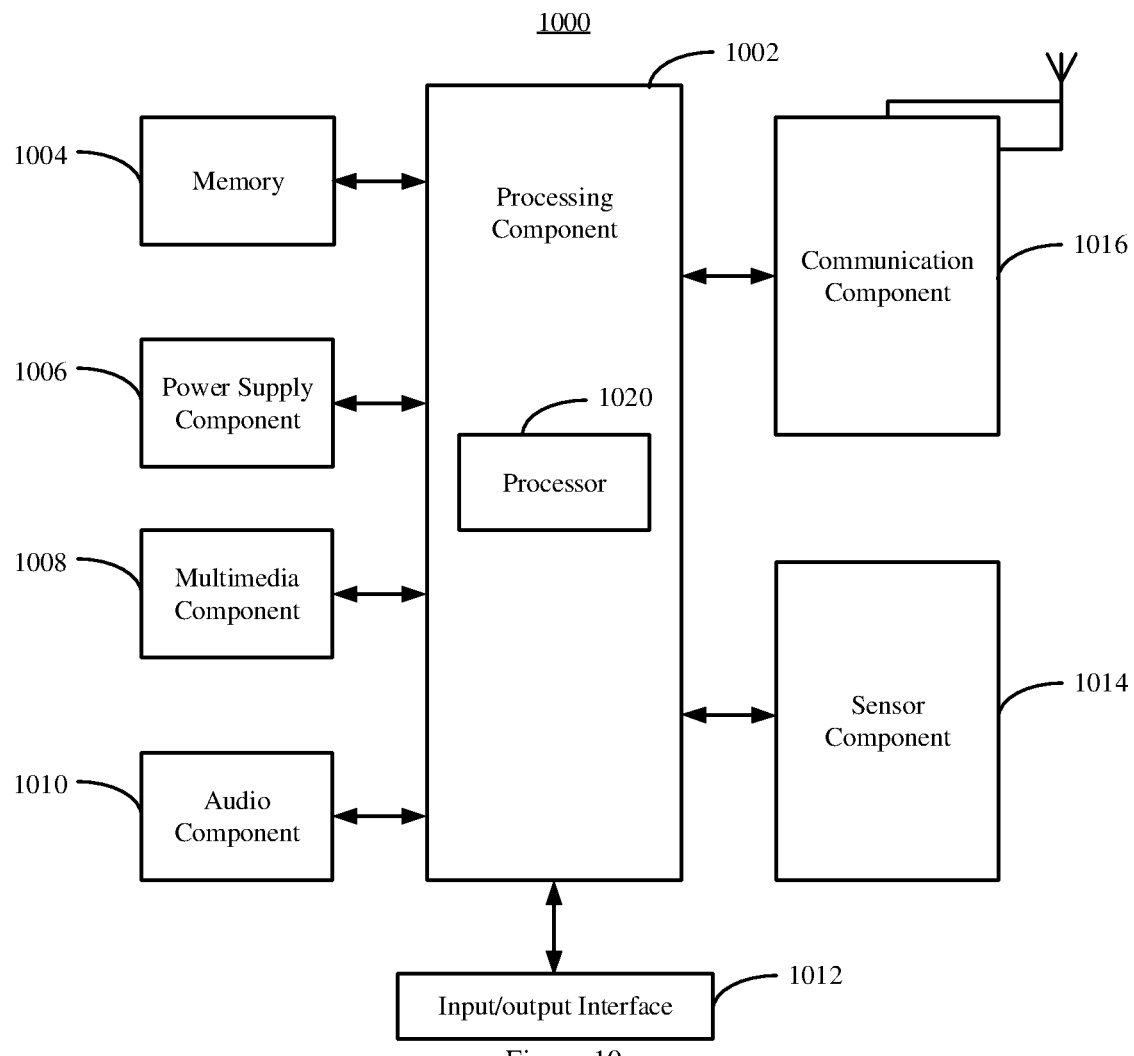
FIG. 10 is a schematic block diagram illustrating a device for controlling random access according to an embodiment of the present disclosure.

FIG. 10 is a schematic block diagram illustrating a device 1000 for controlling random access according to an embodiment of the present disclosure. For example, the device 1000 may be a mobile phone, a computer, a digital broadcasting terminal, a messaging device, a game console, a tablet device, a medical device, a fitness device, a personal digital assistant, etc.

Referring to FIG. 10, the device 1000 may include one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 generally controls the overall operations of the device 1000, such as operations associated with display, telephone calls, data communications, camera operations, and recording operations. The processing component 1002 may include one or more processors 1020 to execute instructions to complete all or part of the steps of the foregoing method. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support operations in the device 1000. Examples of these data include instructions for any application or method operating on the device 1000, contact data, phone book data, messages, pictures, videos, etc. The memory 1004 may be implemented by any type of volatile or non-volatile storage devices or their combination, such as a static random access memory (SRAM), an electrically erasable programmable read-only memory (EEPROM), an erasable and Programmable read only memory (EPROM), a programmable read only memory (PROM), a read only memory (ROM), a magnetic memory, a flash memory, a magnetic or optical disk.

The power supply component 1006 provides powers to various components of the device 1000. The power supply component 1006 may include a power management system, one or more power supplies, and other components associated with generating, managing, and distributing power for the device 1000.

The multimedia component 1008 includes a screen that provides an output interface between the device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slides, and gestures on the touch panel. The touch sensor may not only sense the boundary of a touch or slide action, but also detect the duration and pressure related to the touch or slide operation. In some embodiments, the multimedia component 1008 includes a front camera and/or a rear camera. When the device 1000 is in an operation mode, such as a shooting mode or a video mode, the front camera and/or the rear camera may receive external multimedia data. Each front camera and rear camera may be a fixed optical lens system or have focal length and optical zooming capabilities.

The audio component 1010 is configured to output and/or input audio signals. For example, the audio component 1010 includes a microphone (MIC), and when the device 1000 is in an operation mode, such as a calling mode, a recording mode, and a voice recognition mode, the microphone is configured to receive external audio signals. The received audio signals may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The foregoing peripheral interface module may be a keyboard, a click wheel, a button, and the like. These buttons may include but are not limited to: a home button, a volume button, a start button, and a lock button.

The sensor component 1014 includes one or more sensors for providing the device 1000 with various aspects of state evaluation. For example, the sensor component 1014 may detect the opening/closing state of the device 1000 and the relative positioning of the components. For example, the component is a display and a keypad of the device 1000. The sensor component 1014 may also detect the position changes of the device 1000 or one component of the device 1000, the presence or absence of contacts between the user and the device 1000, the orientation or acceleration/deceleration of the device 1000, and the temperature changes of the device 1000. The sensor assembly 1014 may include a proximity sensor configured to detect the presence of nearby objects when there is no physical contact. The sensor component 1014 may also include a light sensor, such as a CMOS or CCD image sensor, for use in imaging applications. In some embodiments, the sensor component 1014 may also include an acceleration sensor, a gyroscope sensor, a magnetic sensor, a pressure sensor or a temperature sensor.

The communication component 1016 is configured to facilitate a wired or wireless communication between the device 1000 and other devices. The device 1000 may access a wireless network based on a communication standard, such as WiFi, 2G or 3G, or a combination thereof. In an example embodiment, the communication component 1016 receives a broadcast signal or broadcast related information from an external broadcast management system via a broadcast channel. In an example embodiment, the communication component 1016 further includes a near field communication (NFC) module to facilitate a short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an example embodiment, the device 1000 may be implemented by one or more application specific integrated circuits (ASIC), digital signal processors (DSP), digital signal processing devices (DSPD), programmable logic devices (PLD), a field programmable A gate array (FPGA), a controller, a microcontroller, a microprocessor or other electronic components, to implement the method described in any of the above embodiments.

In an example embodiment, a non-transitory computer-readable storage medium including instructions is also provided, such as the memory 1004 including instructions, which may be executed by the processor 1020 of the device 1000 to complete the foregoing method. For example, the non-transitory computer-readable storage medium may be a ROM, a random access memory (RAM), a CD-ROM, a magnetic tape, a floppy disk, an optical data storage device, etc.

After considering the specification and practicing the disclosure disclosed herein, those skilled in the art will easily envisage other embodiments of the present disclosure. This application is intended to cover any variations, uses, or adaptive changes of the present disclosure, which follow the general principles of the present disclosure and include common knowledge or conventional technical means in the technical field not disclosed in the present disclosure. The description and the embodiments are only regarded as exemplary, and the true scope and spirit of the present disclosure are indicated by the appended claims.

It should be understood that the present disclosure is not limited to the precise structure that has been described above and shown in the drawings, and various modifications and changes may be made without departing from its scope. The scope of the present disclosure is only limited by the appended claims.

It is to be noted that in this text, related terms such as "first" and "second" are only used to distinguish one entity or operation from another entity or operation, and do not necessarily require or imply any such actual relationship or order between these entities or operations. The terms "comprise", "include" or any other variants thereof are intended to cover non-exclusive inclusion, so that a process, a method, an article or a device including a series of elements not only includes those elements, but also includes other elements not explicitly listed, or also includes elements inherent to such process, method, article, or device. If there are no more restrictions, the element defined by a sentence of "including a . . . " does not exclude an existence of other identical elements in the process, method, article, or device that includes the element.

The method and apparatus according to the embodiments of this invention are described in detail above. Specific examples are used in this text to illustrate the principles and implementations of this invention. The descriptions of the above embodiments are only used to help understand the method and core concept of the present invention. At the same time, those skilled in the art may change the specific implementation and the scope of application based on the idea of the present invention. In summary, the content of the description should not be construed as a limitation of the present invention.

What is claimed is:

1. A method for controlling random access, applied to an electronic device, the method comprising:
    determining whether a count value of a beam failure indication counter is greater than or equal to a preset value in response to receiving a beam failure instance indication by a medium access control layer from a physical layer; and
    in response to the count value of the beam failure indication counter being greater than or equal to the preset value,
        initiating random access;
        determining a serving cell corresponding to the beam failure indication counter; and
        performing a preset operation for the serving cell, wherein the preset operation comprises at least one of: controlling the physical layer to stop sending the beam failure instance indication to the medium access control layer, or setting the count value of the beam failure indication counter to zero, and the preset operation is configured to avoid triggering further random access during the random access, and avoid resetting or retiming a beam failure recovery timer started by the initiated random access until the beam failure recovery timer expires.

2. The method of claim 1, wherein the preset operation comprises:
    controlling the medium access control layer to ignore a further beam failure instance indication sent from the physical layer.

3. The method of claim 2, further comprising:
    controlling the medium access control layer not to ignore the further beam failure instance indication sent from the physical layer after the random access is successful.

4. The method of claim 1, further comprising:
    controlling the physical layer to continue to send the beam failure instance indication to the medium access control layer after the random access is successful.

5. The method of claim 1, further comprising:
    sending indication information to the physical layer via the medium access control layer before controlling the physical layer to stop sending the beam failure instance indication to the medium access control layer, wherein the indication information indicates to the physical layer that the electronic device is performing the random access, or indicates the physical layer to stop sending the beam failure instance indication to the medium access control layer.

6. The method of claim 1, further comprising:
    resetting the count value of the beam failure indication counter to zero after the random access is successful.

7. The method of claim 1, wherein the serving cell comprises at least one of:
a primary cell, a primary-secondary cell, and a serving cell other than the primary cell and the primary-secondary cell.

8. An electronic device, comprising:
a processor; and
a memory storing instructions executable by the processor,
wherein the processor is configured to:
determine whether a count value of a beam failure indication counter is greater than or equal to a preset value in response to receiving a beam failure instance indication by a medium access control layer from a physical layer; and
in response to the count value of the beam failure indication counter being greater than or equal to the preset value,
initiate random access;
determine a serving cell corresponding to the beam failure indication counter; and
perform a preset operation for the serving cell, wherein the preset operation comprises at least one of: controlling the physical layer to stop sending the beam failure instance indication to the medium access control layer, or setting the count value of the beam failure indication counter to zero, and the preset operation is configured to avoid triggering further random access during the random access, and avoid resetting or retiming a beam failure recovery timer started by the initiated random access until the beam failure recovery timer expires.

9. The electronic device of claim 8, wherein the preset operation comprises:
controlling the medium access control layer to ignore a further beam failure instance indication sent from the physical layer.

10. The electronic device of claim 9, wherein the processor is further configured to control the medium access control layer not to ignore the further beam failure instance indication sent from the physical layer after the random access is successful.

11. The electronic device of claim 8, wherein the processor is further configured to control the physical layer to continue to send the beam failure instance indication to the medium access control layer after the random access is successful.

12. The electronic device of claim 8, wherein the processor is further configured to:
send indication information to the physical layer via the medium access control layer before controlling the physical layer to stop sending the beam failure instance indication to the medium access control layer,
wherein the indication information indicates to the physical layer that the electronic device is performing the random access, or indicates the physical layer to stop sending the beam failure instance indication to the medium access control layer.

13. The electronic device of claim 8, wherein the processor is further configured to reset the count value of the beam failure indication counter to zero after the random access is successful.

14. The electronic device of claim 8, wherein the serving cell comprises at least one of:
a primary cell, a primary-secondary cell, and a serving cell other than the primary cell and the primary-secondary cell.

* * * * *